United States Patent

[11] 3,633,097

[72] Inventor James R. Siconolfi
Rockville, Md.
[21] Appl. No. 877,807
[22] Filed Nov. 18, 1969
[45] Patented Jan. 4, 1972
[73] Assignee Weinschel Engineering Co., Inc.
Gaithersburg, Md.

[54] DATA NORMALIZER FOR MICROWAVE MEASUREMENT OUTPUTS
5 Claims, 4 Drawing Figs.

[52] U.S. Cl. .................................................. 324/58 A
[51] Int. Cl. .................................................. G01n 27/04
[50] Field of Search ......................................... 324/57, 58

[56] References Cited
UNITED STATES PATENTS
2,496,103  1/1950  Neufeld .................. 324/34 X
3,526,834  9/1970  Brown ..................... 324/57

Primary Examiner—Edward E. Kubasiewicz
Attorney—Max L. Libman

ABSTRACT: In making microwave measurements, such as attenuation, VSWR, etc., over a broad frequency band, the resulting test values are obscured by the highly variable frequency characteristics of the testing circuitry itself, which must be corrected for at all points (or at any desired points of interest), from the test output curve to indicate the true value of the item or component being tested, at such points. Where the output is a logarithm of the input, the correction can be accomplished by subtracting calibration curve values from the output values. The present disclosure describes a system which, automatically and continuously during such a microwave broadband measurement, makes this subtraction and provides a true corrected output representing the desired test values.

INVENTOR
James R. Siconolfi

BY *Max L. Libman*

ATTORNEY

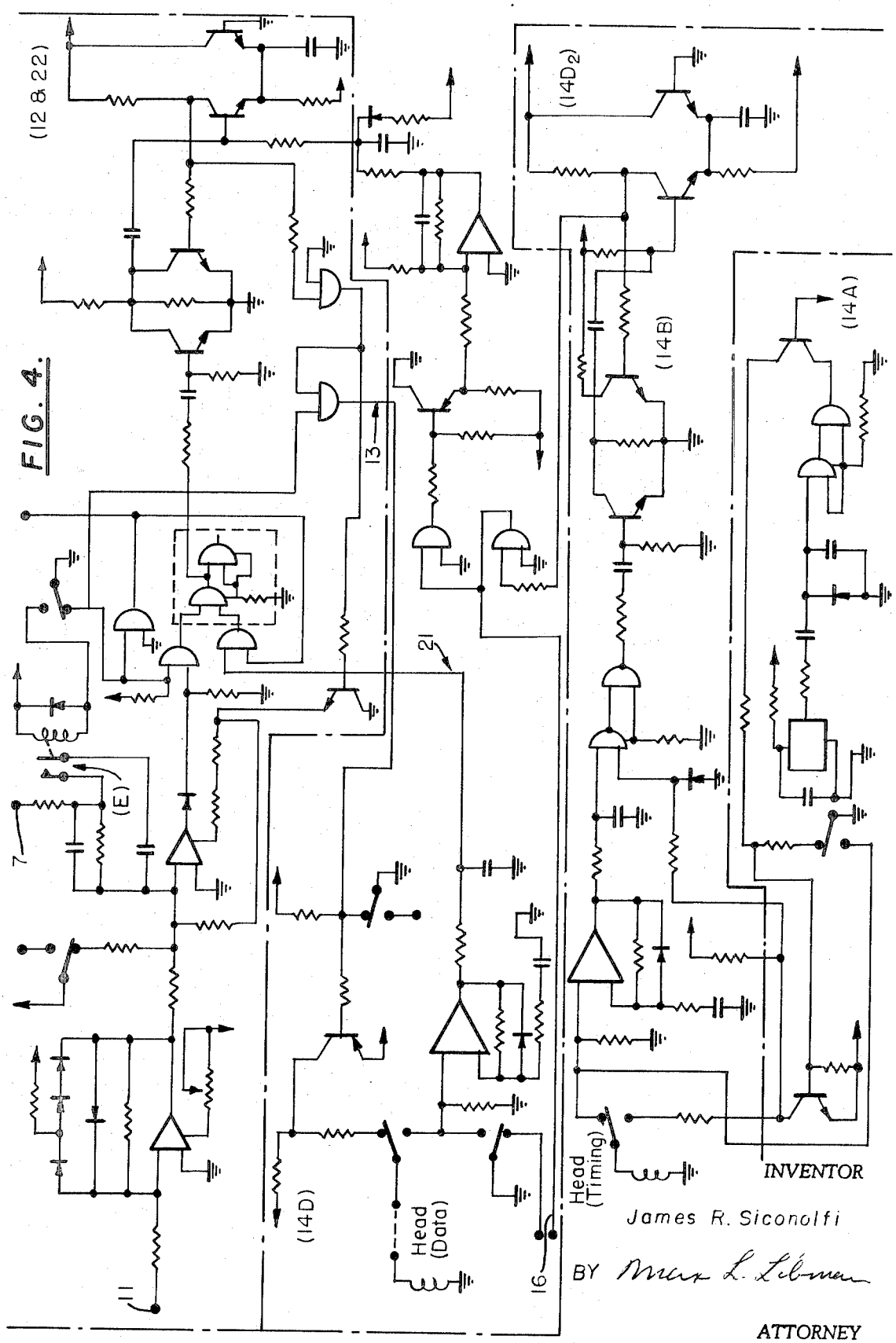

DATA NORMALIZER FOR MICROWAVE MEASUREMENT OUTPUTS

BACKGROUND OF THE INVENTION

A broadband measurement of a microwave component or characteristic, such as attenuation or VSWR, is commonly recorded in the form of a graph or a curve of the test values as ordinates or Y-values plotted against frequency as the X-values over a desired frequency range, when using rectangular coordinates (although the invention may also be used with polar coordinates). In the microwave region, this range may involve a very wide range of frequencies of e.g. one or several octaves, and unfortunately, it is not possible in the present state of the art to provide microwave testing circuits for use in making such measurements, which circuits do not have a highly variable frequency characteristic which tends to mask the test results. In the high-accuracy field, we may be using instruments capable of measuring values in the order of 0.01 db., yet the output variation of even a sophisticated measuring and testing circuit itself may be in the order of 0.05 to 1.0 db., and in this case 0.01 db. measurement of the item under test is meaningless unless the reference line, representing the output of the testing circuit itself, without the item or component to be tested, is continually being subtracted on a real time basis, i.e., at each frequency point, from the measurement reading. In order to do this, the frequency characteristic of the testing circuitry itself, without the test item, must have been previously stored. By plotting this frequency characteristic logarithmically on the same graph as the test output and subtracting it from the test output, the desired test values can be obtained directly in decibels. This can, of course, be done visually by a human operator, but this approach is tedious and expensive. Instead of using a human operator to make the subtraction, a digital computer could be used, in which the initial reference data have been previously stored as a large number of measurement points which are then subtracted from the test data at the same frequency points, but this is expensive and requires competent computer talent. The present invention provides, instead, what amounts to a simple and relatively inexpensive analog computer for doing the same thing and without requiring any special skills.

SUMMARY OF INVENTION

In accordance with the present invention, the frequency characteristic of the testing circuit by itself is first stored, and then this stored value is run continuously and currently with the frequency test of the desired item, and at the same time it is subtracted from the test data. The storage is preferably done on magnetic tape, which may be in the form of an endless tape loop which is run synchronously with the frequency sweep generator which provides the testing frequency. Means are provided for converting the voltage outputs which represent the desired values into frequency values and vice versa, e.g., by frequency modulation for convenient electronic manipulation, as will be explained in more detail below.

In order to thus utilize the stored data, a standard frequency is generated and this frequency is shifted by the level of the measurement being taken. For example, in making a measurement over the range from 2 to 4 GHz., the output of the circuit without the unit to be tested is first recorded and this output is subtracted from all subsequent test runs over this frequency range. The output is a DC voltage which is slowly varying over the frequency range, and this frequency voltage is correlated with the output of the record instrument at all points over the testing range of frequencies; this DC voltage is then used to vary the above standard frequency, and this varying frequency, representing the stored input, is reemitted in synchronism with the test measurement sweep—the reemitted (playback) frequency output is reconverted by a frequency-to-voltage converter to a DC voltage representing the value to be subtracted from the test output as described above, and this DC voltage is then subtracted from the test output, i.e., the difference between the test output and the reference data value (which difference is the desired value) is then recorded as the X-axis input against frequency as the Y-input.

Another important application is the recording of a standard response of a component such as a filter, as the reference. The actual test data are then compared with the "reference" which has been stored and is subtracted from the actual test curve, furnishing at once the positive and negative differences from the reference curve. A typical example is the response of a filter from stop band through pass band through stop band.

Another application is storage of a response versus position where the amplitude at a fixed frequency varies with position. A typical application using a longitudinal displacement at a fixed frequency is the recording of the residual VSWR of a slotted line which is perfectly terminated, has no cyclical residual, but only an inconstant pickup versus position. This must of course be stable so that it may be applied to future measurements and can be subtracted from the actual curve, eliminating the irregularities due to variations in pickup with longitudinal position. This is important for measurement of very low VSWR at a fixed frequency.

Another application at a fixed frequency is used with amplitude variation due to rotation. A typical example is the use of a standard antenna pattern in an antenna pattern test station where the amplitude of the received signal varies as a function of the antenna polar pattern as the turntable is rotated. The "reference antenna" is used to generate a "reference" pattern. The performances of test antennae is compared by subtraction of the stored response with the response of the antenna under test, resulting directly in positive and negative deviations of the test pattern in respect to the standard reference pattern.

DESCRIPTION OF THE FIGURES

FIGS. 3 and 4 is a schematic circuit diagram of a normalizer system according to the invention.

Referring to FIG. 1, the three calibration curves labeled A, B and C show the variation with frequency of the detected output of a typical test circuit, in the frequency range from 2 GHz. to 3.6 GHz., relative to 9.0, 10.0, and 10.1 db. respectively, without a unit being tested. The dashline curve D shows the output with the test unit (e.g., a 10 db. pad) inserted in the testing circuit. It will be apparent that the normal variations in output of the testing circuitry at different frequencies within this particular frequency range are often greater than the variations due to the test unit. The desired values are represented by the vertical distance at any point between curve D and whichever reference line is being used in the measurement. The reference lines are represented by curves A, B or C. One can see the difficulty of obtaining the true insertion loss, in the case of insertion loss measurement, since at each point the value of the test must have subtracted from it the value of the reference line, which can be done visually or by curve following servos from the graph, but which is tedious, time consuming or costly and complex. The resulting corrected value can then be redrawn as indicated by curves A' to D' respectively, where the reference lines can now be represented as straight horizontal lines and the test measurement can readily be made.

Similarly, in making VSWR measurements, the same general principle is applicable. Copending patent application Ser. No. 616,283 of G. U. Sorger shows a swept-frequency VSWR system to which the present invention can be applied. For VSWR measurements, the detected output of the conventional slotted line normally shows a very large variation with frequency even if the slotted line is terminated in a perfectly matched load. This variation contains the frequency variations of the probe, of the power output of the generator, and (usually the largest component) of the coupling between the probe and the slotted line, also of the crystal detector used in the probe. With a data normalizer according to the present invention, the construction of the reference probes becomes much less critical, also the problem of tracking between the reference probe and the measurement probe because even if the variation of the measurement probe with frequency is large, the normalizer simply eliminates this variation and the tracking problem ceases to be critical, as the data normalizer can in some versions handle variations up to 20 db. The errors represented by the curving reference line must, of course, be repeatable and must occur in the same way each time the measurement is made, which is usually the case.

Figure 1:
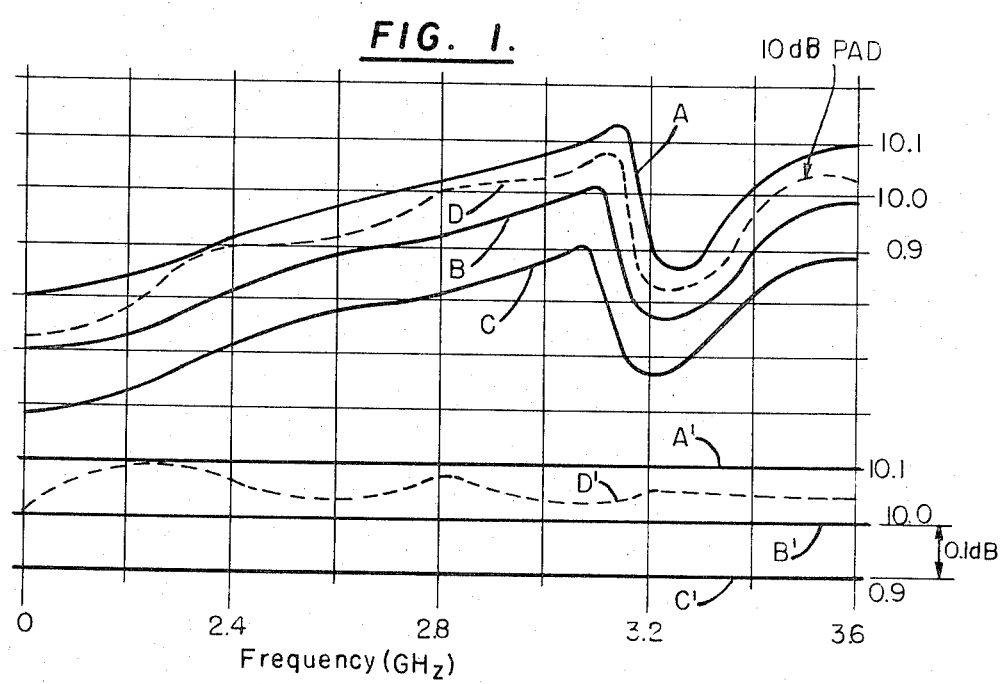
FIG. 1 is a graph showing typical test data, used in explaining the invention.
Figure 2:
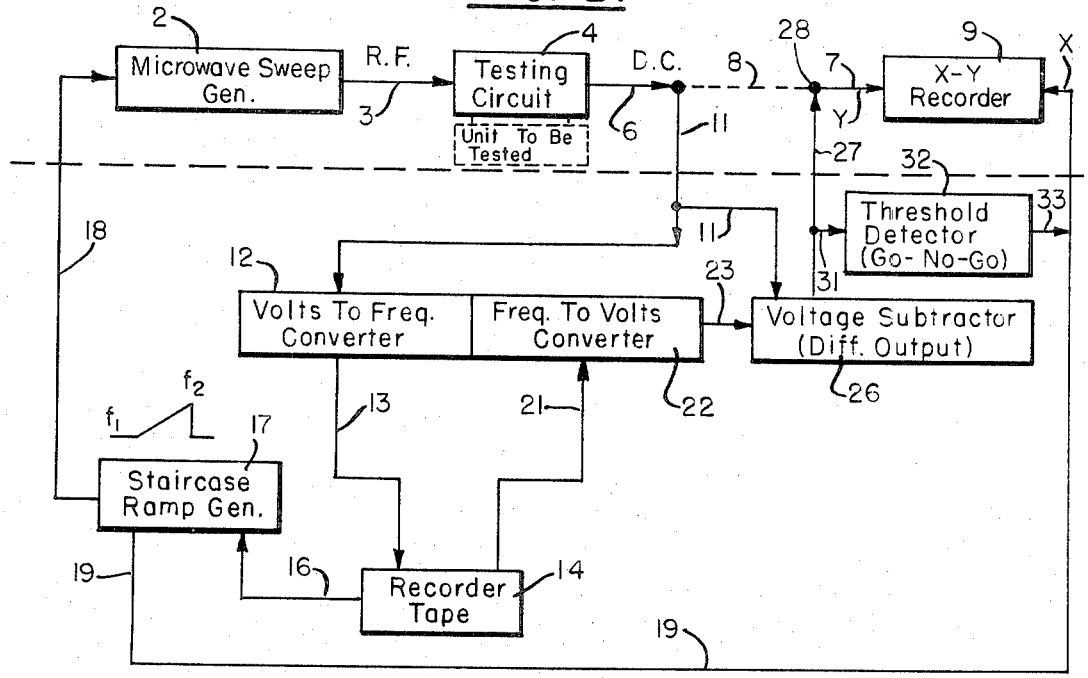
FIG. 2 is a block diagram of the inventive system used in a typical measurement situation.

Referring to FIG. 2, that portion of the Figure above the dashline represents a typical broadband microwave measurement system. The sweep generator 2 produces an RF output on line 3 which varies periodically through a desired frequency range, e.g., 2 to 4 GHz., and which is supplied to a testing circuit 4 which produces a DC output on line 6 which is normally fed on line 7, as indicated by the dotted line 8, to the Y-input axis of a conventional X–Y recorder. Another output from the sweeper is usually supplied to the X-axis of the recorder 9 so that the resultant output graph is coordinated with frequency input. In the case of, for example, insertion loss measurement, the typical output graphs would be as shown in FIG. 1 by curves A–D. In order to normalize this output as described above, the line connection 8 is omitted, and the output on line 6 is instead fed on line 11 to a voltage-to-frequency converter 12 where it is converted to a frequency output, the frequency value of which corresponds to the DC voltage level, as is well understood in the art. The output on line 13 is therefore a signal at a varying frequency and usually at a constant level. This signal is recorded on the tape recorder, preferably on an endless tape loop, in tape recorder 14. Thus the frequency variations on the tape in recorder 14 represent the reference line output corresponding to curve A, B, or C of FIG. 1, i.e., the output variations of the testing circuit without the unit under test. When the test unit is inserted in the testing circuit, and the sweeper 2 used to provide a frequency varying input on line 3 over the same range as before, the output on line 6 now represents the desired test value together with the normal frequency variations of the measuring system itself. In order to eliminate the latter, when the unit under test is inserted, the operation of sweeper 2 must be synchronized with the operation of the tape recorder 14, and this may be done by having a timing signal output from the same tape which has stored the reference line data as above described, emitted on line 16 to control a synchronizing staircase generator 17 which produces a stepped "ramp" output, that is a voltage output which increases stepwise with time over the desired sweep, and this ramp output on line 18 controls the frequency output of sweeper 2; a similar output on line 19, from the ramp generator 17, is supplied to the X-input terminal of the recorder 9, and thus both of these inputs are synchronized with the operation of the tape recorder, to insure that the test output on line 11 is synchronized with the tape recorder output which is supplied on line 21, and which represents the above-described reference curve.

The frequency varying output on line 21 is supplied to a frequency voltage converter 22 and thereby reconverted to a DC output on line 23. The DC test output is now fed from line 11 through line 24 to a "subtract" unit 26, where it is, in effect, opposed to the input on line 23, so that the difference output on line 27 represents the variations due to the test unit alone, and this corresponds to the curve D' of FIG. 1. This is now supplied at terminal 28 to line 7, which is the Y-input line of the X–Y recorder 9, and since, as previously explained, this input is synchronized with the X-input on line 19, the resulting record corresponds to the desired normalized measurement.

Instead of, or in addition to, making the above graphical measurement, the above circuit may be used in automatic testing equipment on a production line basis, where it is desired to have a fixed "go" or "no-go" point for automatic rejection of units which fail to meet predetermined specification values. This is impossible with the type of output obtained from the conventional measurement system 4, since the output on line 6, as previously explained, represents a varying value at different frequencies, in which the desired test data are masked by the frequency characteristics of the testing circuit. However, by using the above normalizer circuit, the output on line 27 may be used for production control. For this purpose, the signal can be taken from line 27 through line 31 to a "go-no-go" unit 32 so arranged that whenever the signal exceeds a predetermined limit in either direction, an output is provided on line 33 which can be used to control automatic rejection of the unsatisfactory unit.

Figure 3:
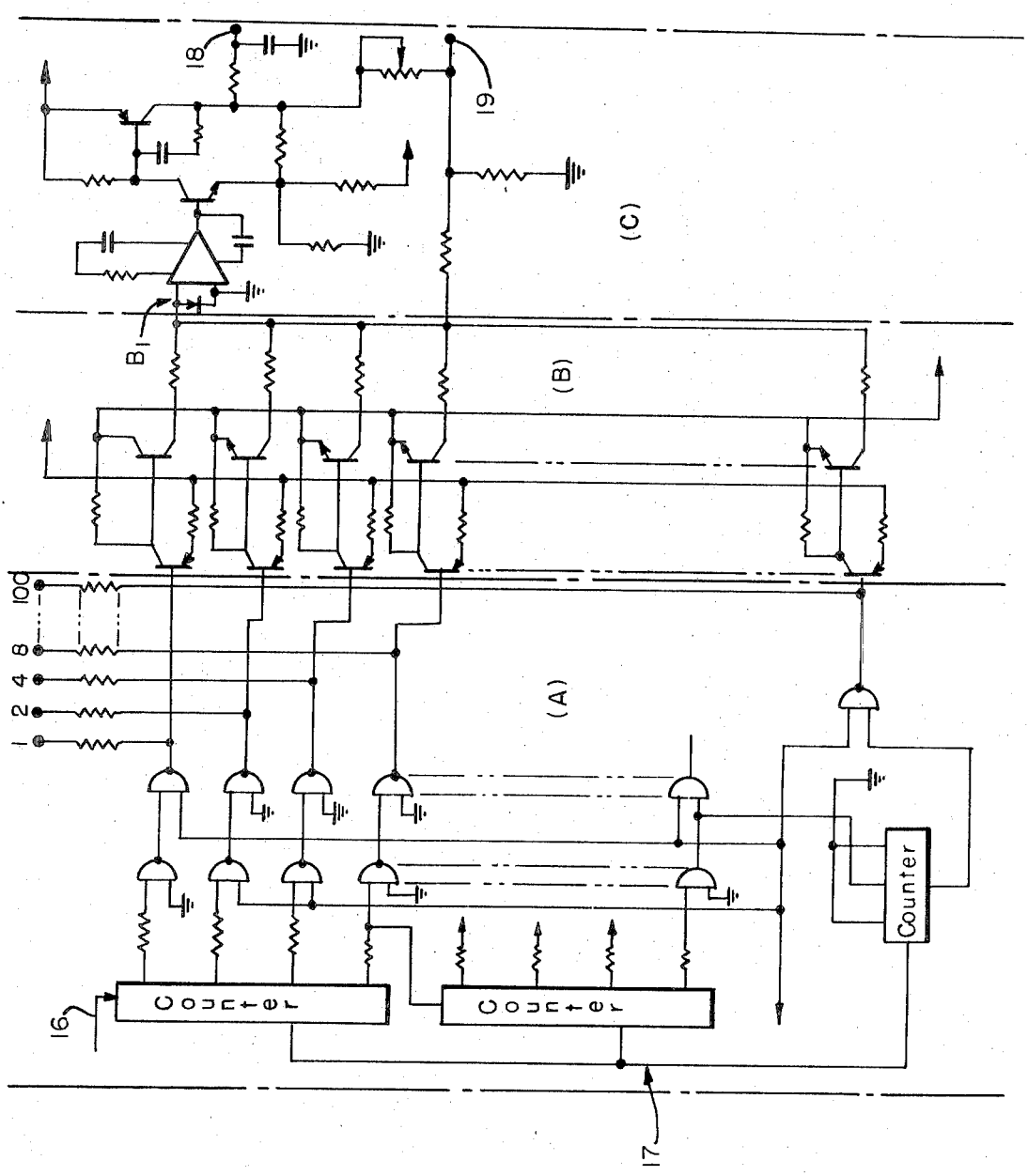

FIGS. 3 and 4 show typical circuitry used in the invention in the boxes labeled 12, 22, 26, 14 and 17 in FIG. 2, and will not be described in detail, as the particular circuitry shown is only illustrative and is not claimed per se to be inventive. It will be apparent that other circuitry could be provided by those skilled in the art for performing the required functions.

In FIG. 3, for example, the section designated A shows typical circuitry for a frequency counter and for converting the frequency signal from the timing circuit track to a logical sequence of logic voltage levels. In a practical circuit, the full sweep signal is 200 counts. The section labeled B is a digital-to-analog converter which generates a current at node $B_1$ from the 200 counts. This current is weighted to produce a uniformly rising staircase of current as indicated in FIG. 2. Section C is a current-to-voltage converting amplifier with a fixed amplitude output at 19 and a controllable output at 18 which are respectively connected to lines 18 and 19 in FIG. 2.

In FIG. 4, section 14A is that part of the recorder 14 (FIG. 2) with the means for storing the timing track signal on the tape from a standard internally generated 2,000 Hz. source; section 14B is the playback amplifier and shaping circuitry required to drive the staircase generator 17. In the typical practical circuit shown, the converters 12 and 22 of FIG. 2 are combined into a single circuit unit, the function of which is switched from that of unit 12 to that of unit 22 by the relay E.

Sections $14D_1$ and $14D_2$ are the elements of the data track circuitry corresponding to the timing track circuitry of sections 14A and 14B. While the circuitry shown is used in a practical embodiment of the invention, it will be understood that the functions described can be performed by other conventional circuitry within the skill of the designer, and that the invention resides in the overall combination producing the interrelated functions described rather than in any circuit details.

I claim:

1. a. System for microwave broadband test measurement of the type wherein an electrical input signal is supplied to a testing circuit and the resulting output of the testing circuit over a desired test range indicates a desired characteristic of a unit or component under test, said output including irrelevant variations due to the testing circuit itself, comprising b. an input circuit for supplying a test input signal over a desired test range, c. a microwave testing circuit supplied with said test signal and into which the unit under test can be inserted so that the output of the testing circuit indicates a characteristic of said unit under test over a desired test range, said testing circuit supplying a DC output signal which varies over said range, d. means for operating said testing circuit over said range without said unit under test to produce a DC data output signal whose variations over said range represent the inherent characteristic of the testing circuit itself over said range, e. storage means for storing and reproducing said data output, f. synchronizing means for operating said storage means and said testing circuit in synchronism, with a unit under test in said testing circuit, to produce a test output from the testing circuit which is indicative of both the desired characteristic of the unit under test and also of the testing circuit itself, and to simultaneously and synchronously produce said data output indicative of the frequency or position characteristic of the testing circuit alone, g. means for converting said data output to a DC normalizing output, h. means for subtracting said DC normalizing output from said test output of sec. (f) at all points along said range to produce a normalized test output indicative of the unit under test, by itself.

2. a. System for microwave broadband test measurement of the type wherein an electrical sweep input of regularly varying frequency is supplied to a testing circuit and the resulting output of the testing circuit indicates a desired characteristic of a unit undergoing test, said output including irrelevant frequency-related variations due to the test circuit itself, comprising b. a sweep circuit for supplying a test input signal varying regularly in frequency over a desired frequency range, c. a microwave testing circuit supplied with said test signal and into which the unit under test can be inserted so that the output of the testing circuit indicates the frequency characteristic of said unit over said desired signal range, said testing circuit supplying a DC output signal which varies with the input frequency, d. means for operating said testing circuit over said frequency range without said unit to produce a DC output signal whose variations over said frequency range represent the inherent frequency characteristic of the testing circuit itself over said range, e. storage means for storing and reproducing said DC output, f. synchronizing means for operating said storage means and said sweep circuit in synchronism, with a test unit in said testing circuit, to produce a test output from the testing circuit which is indicative of the frequency characteristic of the unit under test and also of the testing circuit itself, and to simultaneously and synchronously produce such data output indicative of the frequency characteristic of the testing circuit alone, g. means for converting said data output to a DC normalizing output, h. means for subtracting said DC normalizing output from said test output of sec. (f) at all points over said frequency range to produce a normalized test output indicative of the unit under test by itself.

3. The invention according to claim 2, and means for recording said normalized test output in synchronism with the frequency sweep operation of said sweep circuit to produce a normalized frequency-characteristic curve of the unit under test over said frequency range.

4. The invention according to claim 2, including voltage-to-frequency converter means supplied with the DC output signal of sec. (d) to produce a data output whose frequency is a function of the DC signal level.

5. a. System for microwave broadband test measurement of the type wherein an electrical input of fixed frequency and amplitude varying with the position of a movable element is supplied to a testing circuit and the resulting output of the testing circuit over a desired test range indicates a desired characteristic of a unit undergoing test, said output including irrelevant position-related variations due to the test circuit itself, comprising b. an input circuit for supplying a test input signal varying in amplitude with said position, c. a microwave testing circuit supplied with said test signal and into which the unit under test can be inserted so that the output of the testing circuit indicates a position characteristic of said unit over a desired test range, said testing circuit supplying a DC output signal which varies with said position, d. means for operating said testing circuit over said position range without said unit to produce a DC data output signal whose variations over said position range represent the inherent position characteristic of the testing circuit itself over said range, e. storage means for storing and reproducing said data output, F. SYNCHRONIZING MEANS FOR OPERATING SAID STORAGE means AND VARYING SAID POSITION IN CYNCHRONISM, WITH A TEST UNIT IN SAID TESTING CIRCUIT, TO PRODUCE A TEST OUTPUT FROM THE TESTING CIRCUIT WHICH IS INDICATIVE OF BOTH THE DESIRED POSITION CHARACTERISTIC OF THE UNIT under test and also of the testing circuit itself, and to simultaneously and synchronously produce said data output indicative of the position characteristic of the testing circuit alone, g. means for converting said data output to a DC normalizing output, G. MEANS FOR CONVERTING SAID DATA OUTPUT TO A DC normalizing output, h. means for subtracting said DC normalizing output from said test output of Sec. (f) at all points as said position is changed to produce a normalized test output indicative of the unit under test, by itself.

* * * * *